US010333117B2

(12) United States Patent
Son et al.

(10) Patent No.: US 10,333,117 B2
(45) Date of Patent: Jun. 25, 2019

(54) BATTERY PACK INCLUDING CONNECTION BOARD, PCB HOUSING ACCOMODATING PCB, AND LOCKING PART LOCKING PCB HOUSING TO CONNECTION BOARD

(71) Applicant: LG ELECTRONICS INC., Seoul (KR)

(72) Inventors: Ingook Son, Seoul (KR); Sijung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 25 days.

(21) Appl. No.: 15/610,849

(22) Filed: Jun. 1, 2017

(65) Prior Publication Data

US 2017/0352852 A1    Dec. 7, 2017

(30) Foreign Application Priority Data

Jun. 1, 2016 (KR) .................. 10-2016-0068142

(51) Int. Cl.
*H01M 2/10* (2006.01)
*H01M 2/20* (2006.01)
(Continued)

(52) U.S. Cl.
CPC ......... *H01M 2/1077* (2013.01); *H01M 2/206* (2013.01); *H01M 2/305* (2013.01);
(Continued)

(58) Field of Classification Search
CPC .... H01M 2/1077; H01M 2/206; H01M 2/305; H01M 10/425
(Continued)

(56) References Cited

U.S. PATENT DOCUMENTS

2009/0258283 A1   10/2009  Kim
2014/0254122 A1*   9/2014  Nakamura ............ H01M 10/48
                                                       361/775
(Continued)

FOREIGN PATENT DOCUMENTS

EP          2315297         6/2013
EP          2693531         2/2014
(Continued)

OTHER PUBLICATIONS

Extended European Search Report in European Application No. 17164709.2, dated Jun. 1, 2017, 7 pages (with English translation).

*Primary Examiner* — Sean P Cullen
(74) *Attorney, Agent, or Firm* — Fish & Richardson P.C.

(57) ABSTRACT

A battery pack may include a battery cell with a cell lead; a bus bar bonded to the cell lead and having a terminal pin; a connection board having the bus bar mounted thereon; and a printed circuit board (PCB). The PCB may have a terminal clip selectively connected to and disconnected from the terminal pin of the bus bar. The battery pack may also include a PCB housing defining a PCB accommodation space accommodating the PCB. The battery pack may further include a locking part that, in a first locking state, locks the PCB housing to the connection board at a first position where the terminal pin of the bus bar does not elastically deform the terminal clip of the PCB; and in a second locking state, lock the PCB housing to the connection board at a second position where the terminal pin elastically deforms the terminal clip.

20 Claims, 8 Drawing Sheets

(51) Int. Cl.
  *H01M 2/30*      (2006.01)
  *H01M 10/42*     (2006.01)
  *H01M 10/613*    (2014.01)
  *H01M 10/6554*   (2014.01)

(52) U.S. Cl.
  CPC ........ *H01M 10/425* (2013.01); *H01M 10/613* (2015.04); *H01M 10/6554* (2015.04); *H01M 2010/4271* (2013.01); *H01M 2220/20* (2013.01)

(58) Field of Classification Search
  USPC .................................... 429/7, 158, 159, 160
  See application file for complete search history.

(56) References Cited

U.S. PATENT DOCUMENTS

2014/0299373 A1* 10/2014 Nakamura .......... H01M 10/425
                                                  174/74 R
2016/0043446 A1*  2/2016 Fritz .................. H01M 10/425
                                                  429/90

FOREIGN PATENT DOCUMENTS

| JP | 2011009023 A   | 1/2011  |
|----|----------------|---------|
| KR | 10-2009-0108418 | 10/2009 |
| KR | 20140091123 A  | 7/2014  |
| KR | 20150056885 A  | 5/2015  |
| KR | 10-2015-0132903 | 11/2015 |
| KR | 20150138426 A  | 12/2015 |
| KR | 10-2016-0026028 | 3/2016  |
| KR | 10-2014-0085273 | 7/2017  |

* cited by examiner

BATTERY PACK INCLUDING CONNECTION BOARD, PCB HOUSING ACCOMODATING PCB, AND LOCKING PART LOCKING PCB HOUSING TO CONNECTION BOARD

CROSS-REFERENCE TO RELATED APPLICATION(S)

The present application claims priority under 35 U.S.C. 119 and 35 U.S.C. 365 to Korean Patent Application No. 10-2016-0068142 (filed on Jun. 1, 2016), which is hereby incorporated by reference in its entirety.

TECHNICAL FIELD

The present disclosure relates to a battery pack.

BACKGROUND

A battery pack is typically implemented by a plurality of battery cells that supply a voltage, and is used in various industrial fields such as mobile terminals, home appliances, and vehicles.

In some scenarios, a battery pack is mounted and used in an electric vehicle using driving force output from a driving motor. Such a battery pack may be configured by coupling a plurality of battery modules, where each of the plurality of battery modules includes at least one battery cell.

SUMMARY

Implementations are described herein that provide a battery pack.

In one aspect, a battery pack may include a battery cell that includes a cell lead; a bus bar bonded to the cell lead and having a terminal pin formed therein; a connection board having the bus bar mounted thereon; and a printed circuit board (PCB). The PCB may have a terminal clip mounted thereon, the terminal clip of the PCB configured to be selectively connected to and disconnected from the terminal pin of the bus bar mounted on the connection board. The battery pack may also include a PCB housing defining a PCB accommodation space that accommodates the PCB. The battery pack may further include a locking part configured to: in a first locking state, lock the PCB housing to the connection board at a first position in which the terminal pin of the bus bar mounted on the connection board does not elastically deform the terminal clip of the PCB; and in a second locking state, lock the PCB housing to the connection board at a second position in which the terminal pin elastically deforms the terminal clip.

In some implementations, the locking part may include: a protrusion formed on one of the PCB housing or the connection board; a first engaging projection formed on the other of the PCB housing or the connection board and configured to lock the protrusion in the first locking state of the locking part; and a second engaging projection formed on the other of the PCB housing or the connection board, the second engaging projection spaced apart from the first engaging projection and configured to lock the protrusion in the second locking state of the locking part.

In some implementations, the first engaging projection and the second engaging projection of the locking part may be configured to define a gap therebetween into which the protrusion of the locking part is inserted.

In some implementations, the connection board may further include a PCB housing accommodation wall configured to accommodate the PCB housing. A size of the PCB housing accommodation wall may be greater than a size of the PCB housing.

In some implementations, the protrusion of the locking part may be formed on the PCB housing, and may protrude from an outer surface of the PCB housing. The first engaging projection and the second engaging projection of the locking part may be formed on the connection board, and may protrude from an inner surface of the PCB housing accommodation wall of the connection board.

In some implementations, the PCB housing may define a pair of slits on a portion of the PCB housing that is adjacent to the terminal clip of the PCB in a state in which the PCB is housed in the PCB housing. A lever may be connected to the PCB housing and formed between the pair of slits.

In some implementations, the protrusion of the locking part may be formed on the lever.

In some implementations, the lever and an inner surface of the PCB housing accommodation wall may define a gap therebetween.

In some implementations, the terminal clip of the PCB may include: an outer clip; and a pair of contacts extending from the outer clip to an inside of the outer clip and configured to be elastically deformed by the terminal pin of the bus bar in a state in which the PCB is connected to the bus bar.

In some implementations, a first end of the pair of contacts of the terminal clip of the PCB may be connected to the outer clip of the terminal clip. A second end of the pair of contacts may be a free end.

In some implementations, in the state in which the PCB is connected to the bus bar: the terminal pin of the bus bar may be configured to enter between the pair of contacts of the terminal clip of the PCB to elastically deform the pair of contacts away from each other.

In some implementations, the locking part may be further configured to: in the first locking state, lock the PCB housing to the connection board at a first position in which the terminal pin of the bus bar mounted on the connection board does not elastically deform the pair of contacts of the PCB; and in the second locking state, lock the PCB housing to the connection board at a second position in which the terminal pin elastically deforms the pair of contacts.

In some implementations, the pair of contacts of the PCB may be configured to face each other in a direction that is orthogonal to a contact direction of the cell lead and the bus bar.

In some implementations, the PCB housing may further include a support wall configured to support the terminal clip of the PCB.

In some implementations, the terminal clip of the PCB may define an opening through which an inside of the terminal clip is accessible. The opening may be formed in an area of the terminal clip that faces the PCB.

In another aspect, a battery pack may include: a battery cell that includes a cell lead; a bus bar bonded to the cell lead and having a terminal pin formed therein; a connection board having the bus bar mounted thereon; and a printed circuit board (PCB). The PCB may have a terminal clip mounted thereon, the terminal clip of the PCB configured to be selectively connected to and disconnected from the terminal pin of the bus bar mounted on the connection board. The battery pack may also include a PCB housing defining a PCB accommodation space that accommodates the PCB. The battery pack may further include a locking part configured to lock the PCB housing to the connection board. The connection board may further include a PCB housing accommodation wall configured to accommodate the PCB housing. The locking part may include a protrusion formed on one of the PCB housing or the PCB housing accommodation wall; a first engaging projection formed on the other of the PCB housing or the PCB housing accommodation wall; and a second engaging projection formed on the other of the PCB housing or the PCB housing accommodation wall, the second engaging projection spaced apart from the first engaging projection. In a first locking state, the protrusion of the locking part may be locked by the first engaging projection and the second engaging projection at a first position in which the terminal pin of the bus bar mounted on the connection board does not elastically deform the terminal clip of the PCB, and in a second locking state, the protrusion of the locking part is locked by the second engaging projection at a second position in which the terminal pin elastically deforms the terminal clip.

In some implementations, the PCB housing may define a pair of slits on a portion of the PCB housing that is adjacent to the terminal clip of the PCB in a state in which the PCB is housed in the PCB housing. A lever connected to the PCB housing may be formed between the pair of slits. The protrusion of the locking part may be formed on the lever, and the first engaging projection and the second engaging projection of the locking part may be formed on the connection board, and protrude from an inner surface of the PCB housing accommodation wall of the connection board.

In some implementations, the lever and an inner surface of the PCB housing accommodation wall may define a gap therebetween. In some implementations, the terminal clip of the PCB may include: an outer clip; and a pair of contacts extending from the outer clip to an inside of the outer clip and configured to be elastically deformed by the terminal pin of the bus bar in a state in which the PCB is connected to the bus bar. The pair of contacts of the PCB may be configured to face each other in a direction that is orthogonal to a contact direction of the cell lead and the bus bar.

In some implementations, the outer clip of the terminal clip of the PCB may define an opening through which an inside of the terminal clip is accessible, the opening formed in an area of the outer clip that faces the PCB.

Both the foregoing general description and the following detailed description are exemplary and explanatory and are intended to provide further explanation of the subject matter claimed.

DETAILED DESCRIPTION

Implementations described herein provide a battery pack and, more particularly, a battery pack in which a cell lead of a battery cell is bonded to a bus bar.

The battery pack may include a plurality of battery modules, each having at least one battery cell. Different battery modules cells may be electrically connected to each other through a bus bar. The battery cells may be connected by the bus bar in series or in parallel. As such, the bus bar provides an electrical interconnection between different battery cells.

The battery pack may further include a protection circuit assembly connected to the bus bar. The protection circuit assembly may include at least one circuit unit for protecting the battery pack.

In some scenarios, the battery pack may be configured to mitigate damage to a part mounted on a printed circuit board (PCB) caused by ultrasonic waves or vibration, and mitigate a failure rate of the battery pack.

According to some implementations, the battery pack may also mitigate damage to parts mounted on the PCB caused by ultrasonic waves or vibrations that are generated upon bonding the cell lead and the bus bar.

In some implementations, the battery pack may be configured with a protrusion formed on a deformable lever, and may facilitate detachment of the PCB housing from the PCB housing accommodation wall, e.g., by a manufacturer or a service provider.

In some scenarios, the lever may be easily gripped through the gap formed between the lever and the PCB housing accommodation wall, and the PCB housing may be easily detached from the PCB housing accommodation wall, e.g., upon repairing the PCB module.

The battery pack may also mitigate ultrasonic waves or vibrations generated upon bonding of the cell lead and the bus bar from being delivered to the terminal clip. As such, the battery pack may increase reliability of protection of the parts mounted on the PCB.

In addition, the battery pack may be configured to facilitate identification of the contact state of the terminal pin and the terminal clip or the elastically formed state of the terminal clip, without requiring detachment. As such, the battery pack may mitigate damage to parts mounted on the PCB.

Reference will now be made in detail to some examples of implementations, which are illustrated in the accompanying drawings.

Figure 1:
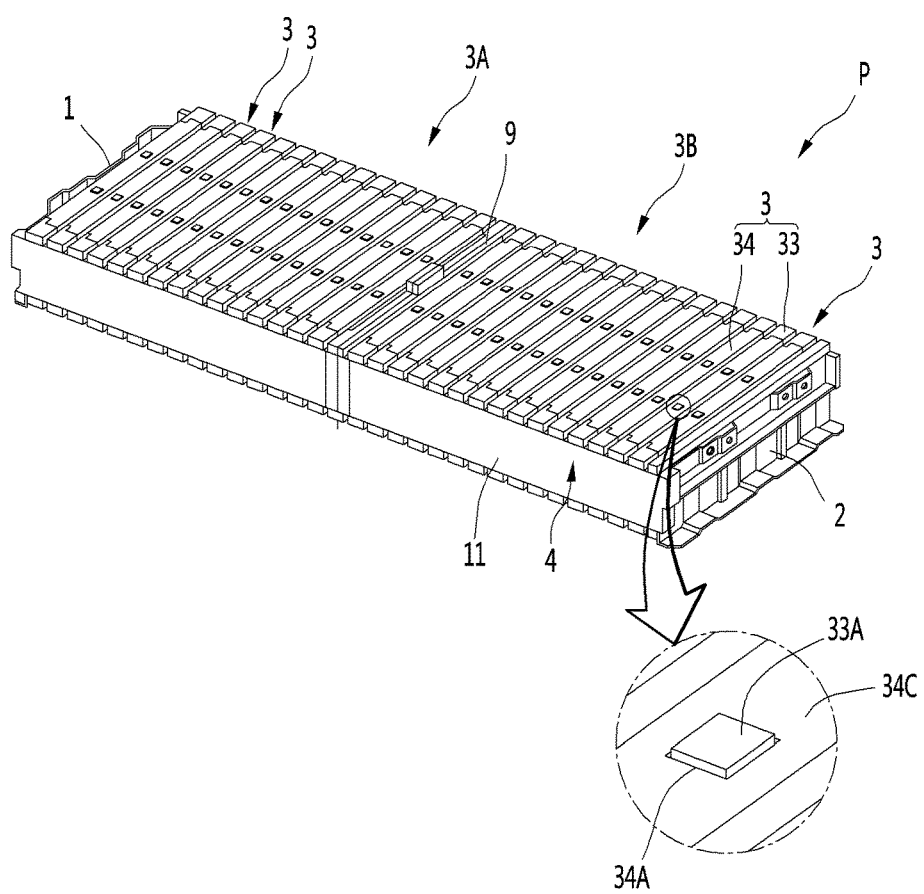
FIG. 1 is a diagram illustrating an example of a perspective view showing a battery pack.
Figure 2:
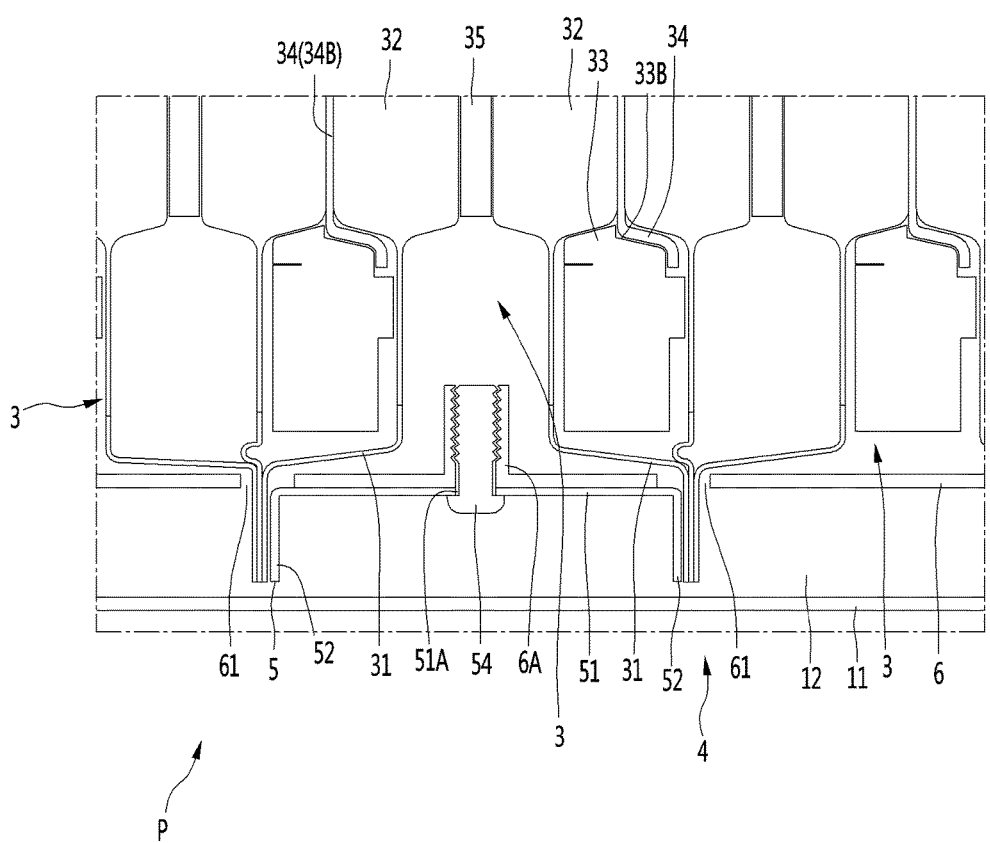
FIG. 2 is a diagram illustrating an example of a cross-sectional view of the battery pack shown in FIG. 1, viewed from a top perspective relative to FIG. 1.

FIG. 1 is an example of a perspective view showing a battery pack according to an implementations, and FIG. 2 is an example of a cross-sectional view of the battery pack, viewed from a top perspective relative to FIG. 1.

As shown in FIG. 1, the battery pack P may include a pair of end plates 1 and 2 and a plurality of battery modules 3 disposed between the pair of end plates 1 and 2.

The plurality of battery modules 3 may be laminated between the pair of end plates 1 and 2. For example, the plurality of battery modules 3 may be laminated between the pair of end plates 1 and 2 in a horizontal or vertical direction.

The plurality of battery modules 3 may be divided into a plurality of groups divided by at least one separator. The example of FIG. 1 illustrates two battery module groups 3A and 3B that are separated by a separator 9. As such, the battery pack P may include the separator 9 that divides the group 3A from the group 3B.

Each battery module 3 may include a cartridge 33 and a cooling cover 34, and a battery cell (e.g., battery cell 32 in FIG. 2) may be disposed between the cartridge 33 and the cooling cover 34.

With further reference to FIG. 1, a projection 33A may be formed on any one of the cartridge 33 or the cooling cover 34. A projection insertion hole 34A, into which the projection 33A is inserted, may be formed in the other of the cartridge 33 or the cooling cover 34. For example, if the projection 33A is formed on a coupling plate 34C of the cooling cover 34, then the projection insertion hole 34A, into which the projection 33A is inserted, may be formed in the cartridge 33. In contrast, if the projection insertion hole 34A is formed in the coupling plate 34C, then the projection 33A inserted into the projection insertion hole 34A may be formed on the cartridge 33.

FIG. 2 illustrates an example of a cross-sectional view of the battery pack P, viewed from a top perspective relative to FIG. 1. Each battery module 3 may include at least two battery cells 32, with a buffer member 35 disposed between the at least two battery cells 32. The buffer member 35 may be made of, for example, an elastic material.

In the example of FIG. 2, each battery module 3 includes a pair of battery cells 32, where one of the battery cells 32 is seated to contact the cartridge 33 and the other of the battery cells 32 is seated to surface-contact the cooling cover 34.

As shown, each battery cell 32 may include a cell lead 31. The cell lead 31 may be a positive or negative cell lead provided in the battery cell 32.

The cooling cover 34 may include a heat transfer plate 34B facing one of the battery cells 32. The heat transfer plate 34B may include a flat part that surface-contacts the battery cell 32.

The cooling cover 34 may also include coupling plates 34C (e.g., shown in FIG. 1) bent from the heat transfer plate 34B and coupled to the cartridge 33.

As shown in FIG. 2, an opening or recess 33B, into which the cooling cover 34 of a neighboring battery module 3 is inserted, may be formed in the cartridge 33.

When the cartridge 33 and the cooling cover 34 are thus coupled, the cooling cover 34, any one of the pair of battery cells 32, the buffer member 35, the other of the pair of battery cells 32, and the cartridge 33 may be coupled to form a single battery module 3.

At least a portion of the cell lead 31 of the battery cell 32 may be located outside the cartridge 33 and the cooling cover 34. The cell lead 31 may be connected to a connection board assembly 4.

The battery pack P may thus implement the connection board assembly 4 connected with the plurality of battery modules 3. The connection board assembly 4 may be connected with the cell lead 31. The plurality of battery cells 32 may be connected in series or in parallel.

As shown in FIG. 2, the battery pack P may include a bus bar 5. The bus bar 5 may electrically interconnect different battery cells 32. In particular, in FIG. 2, the bus bar 5 is bonded to cell lead 31 of battery cell 32. The battery pack P may also include a connection board 6 on which the bus bar 5 is mounted. The battery pack P may further include an outer cover 11 covering the connection board 6 and the bus bar 5.

The bus bar 5 may be mounted to the connection board 6 by various implementations. One example of this mounting is shown in FIG. 2 and described below, where the bus bar 5 is coupled to the connection board 6 by coupling member 54, which may be a screw, for example.

As shown in the example of FIG. 2, the bus bar 5 may include a coupling part 51 that couples to the connection board 6. The coupling part 51 of bus bar 5 may also have a cell lead connection part 52 that is bonded to the cell lead 31.

In some implementations, the bus bar 5 and connection board 6 may be coupled together by a hook member or coupling member, which may be a screw. As shown in FIG. 2, the coupling part 51 of bus bar 5 couples to coupling member 54 (e.g., a screw or other suitable coupling member). In such implementations, the coupling part 51 may have a through-hole 51A through which the coupling member 54 passes. In addition, the connection board 6 may have a coupling part 6A that couples with the coupling member 54. For example, the coupling part 6A may be a coupling boss or a nut that is threadedly coupled with the coupling member 54 (e.g., a screw).

In some implementations, the coupling part 51 of bus bar 5 may have a plurality of cell lead connection parts 52, e.g., a pair of cell lead connection parts 52 as shown FIG. 2.

The bus bar 5 may be conductively connected to the pair of cell leads 31, and thus the pair of cell leads 31 may be electrically connected to each other through the bus bar 5. The pair of cell lead connection parts 52 may face each other, for example, by being bent to be perpendicular to the coupling part 51 of bus bar 5.

As such, the bus bar 5 may conductively connect the cell leads 31 of different battery cells 32. The cell lead 31 of any one of the plurality of battery cells 32 may be connected to any one of the pair of cell lead connection parts 52. The cell lead of the other of the plurality of battery cells 32 may be connected to the other of the pair of cell lead connection parts 52.

The cell lead 31 may be stably bonded to the bus bar 5, such that the cell lead 31 and the bus bar 5 transmit sufficient power. For example, in some implementations, and the cell lead 31 may be bonded to the bus bar 5 through ultrasonic bonding or vibration bonding.

In some scenarios, a plurality of bus bars 5 may be mounted on the connection board 6. For example, the plurality of bus bars 5 may interconnect pairs of battery cells 32 in a plurality of battery modules 3. The plurality of bus bars 5 may be spaced apart from each other in a direction parallel to the lamination direction of the battery modules 3.

The connection board 6 may be formed of a plate elongated in the direction parallel to the lamination direction of the plurality of battery modules 3.

In some implementations, as shown in FIG. 2, the connection board 6 may have a through-hole 61 through which the cell lead 31 of the battery cell 32 passes.

A space 12 for accommodating the bus bar 5 may be formed between the connection board 6 and the outer cover 11. As such, the bus bar 5 may be accommodated in the space 12 formed between the connection board 6 and the outer cover 11 in a state of being mounted on the connection board 6.

Upon assembling the battery pack P, the bus bar 5 may be bonded to the cell lead 31 of the battery cell 32 in a state of being coupled to the connection board 6.

The outer cover 11 may be connected to the end plates 1 and 2 shown in FIG. 1, the separator 9 and the connection board 6.

The outer cover 11 may protect the bus bar 5 mounted on the connection board 6. The outer cover 11 may protect the cell lead 31 located in the space 12.

Figure 3:
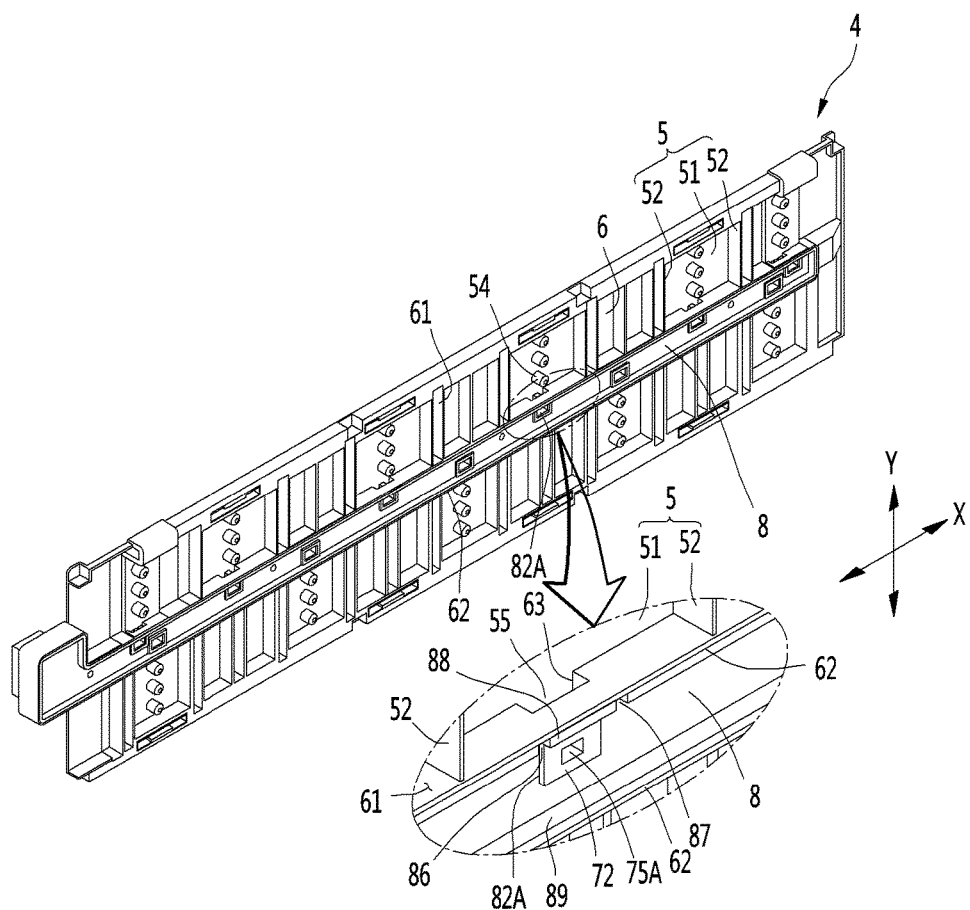
FIG. 3 is a diagram illustrating an example of a perspective view showing the inside of a connection board assembly of the battery pack shown in FIGS. 1 and 2.
Figure 4:
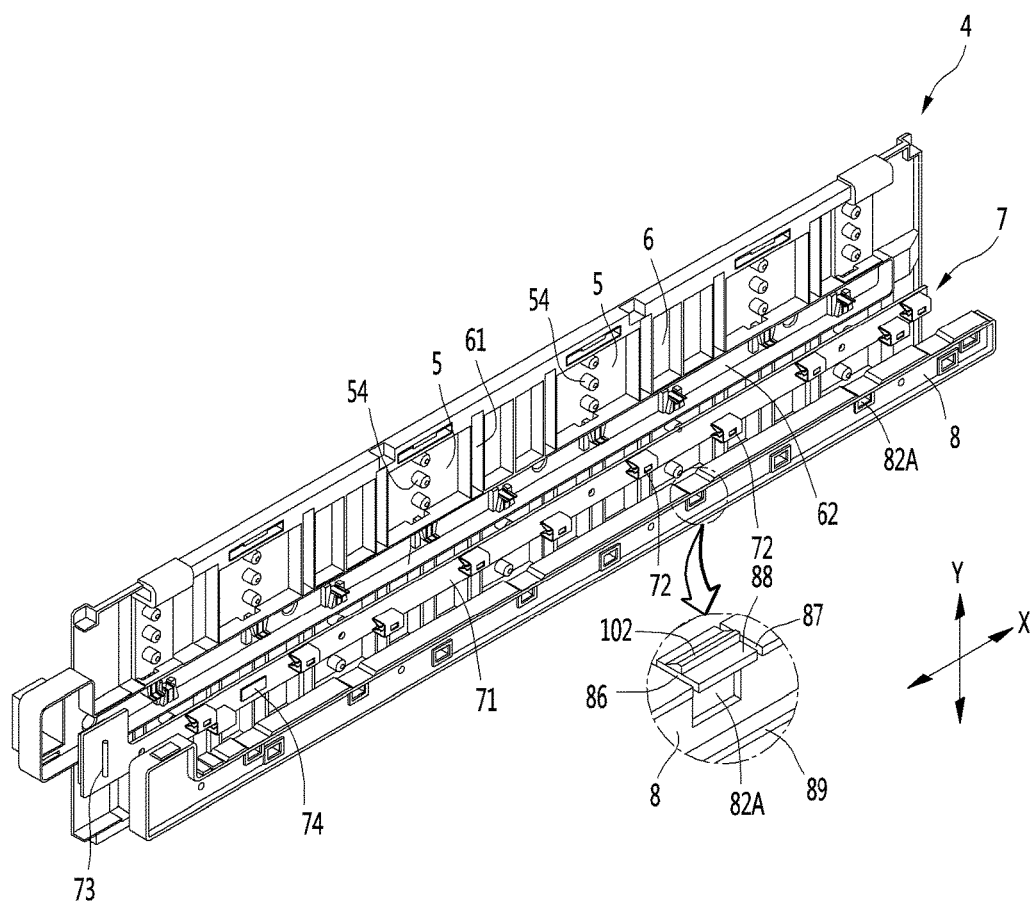
FIG. 4 is a diagram illustrating an example of an exploded perspective view of the connection board assembly shown in FIG. 3.
Figure 5:
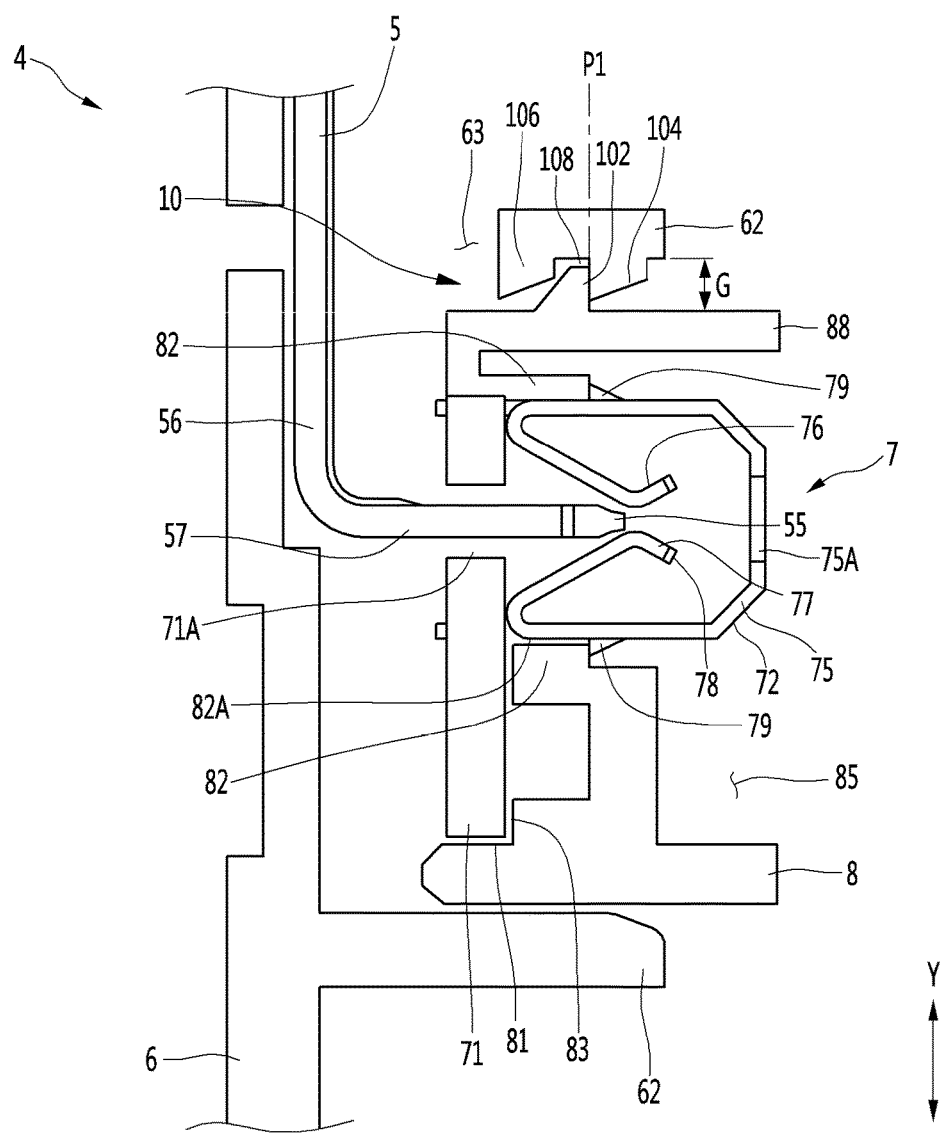
FIG. 5 is a diagram illustrating an example of an enlarged cross-sectional view showing a bus bar and a PCB module before a shell lead and the bus bar are bonded.
Figure 6:
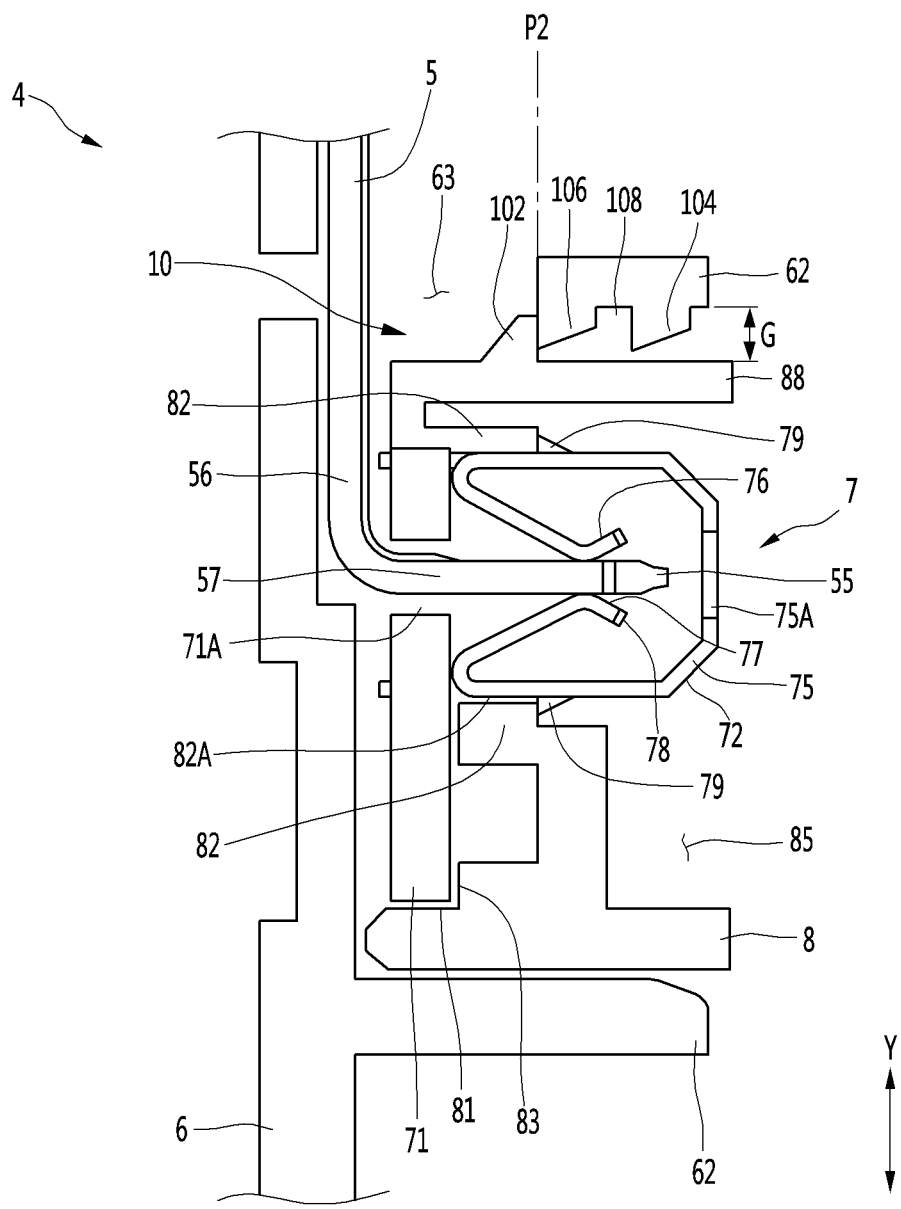
FIG. 6 is a diagram illustrating an example of an enlarged cross-sectional view showing a bus bar and a PCB module after a shell lead and the bus bar are bonded according to an implementation.

FIG. 3 is a perspective view showing the inside of the connection board assembly shown in FIGS. 1 and 2. FIG. 4 is an exploded perspective view of the connection board assembly shown in FIG. 3. FIG. 5 is an enlarged cross-sectional view showing a bus bar and a PCB module before a shell lead and the bus bar are bonded, according to an implementation. FIG. 6 is an enlarged cross-sectional view showing the bus bar and the PCB module after the shell lead and the bus bar are bonded, according to an implementation.

As shown in FIG. 3, in some implementations the battery pack P may further include a PCB module 7. The PCB module 7 may be connected to the bus bar 5. The battery pack P may also include a PCB housing 8 for protecting the PCB module 7.

The PCB module 7 and PCB housing 8, along with bus bar 5 and connection board 6, may together form a connection board assembly 4, as shown in FIGS. 1 and 2.

A terminal pin 55 may be formed in the bus bar 5 as shown in FIGS. 3, 5 and 6. The terminal pin 55 may be detachably connected to the PCB module 7. As such, the PCB module 7 may be detached from terminal pin 55 of bus bar 5, e.g., to be repaired or replaced.

The terminal pin 55 may protrude from the bus bar 5. For example, the terminal pin 55 may extend from the coupling part 51. The protrusion of terminal pin 55 may be implemented, for example, as extension 56 extending from the coupling part 51 of bus bar 5, as shown in FIGS. 5-8. In addition, a bending part 57 may be bent from the extension 56.

The extension 56 of terminal pin 55 may extend from the coupling part 51 of bus bar 5 and may couple with PCB module 7. For example, the extension 56 may extend such that at least a portion thereof is located between the connection board 6 and the PCB module 7 upon mounting the PCB module 7 to the connection board 6.

The bending part 57 may extend to be perpendicular to the extension 56. The bending part 57 may be provided such that at least a portion thereof is inserted into the PCB module 7 upon mounting the PCB module 7 to the connection board 6, and may be in contact with the PCB module 7.

In some implementations, the connection board 6 may also have a PCB housing accommodation wall 62, for accommodating the PCB housing 8. The size of the PCB housing accommodation wall 62 may be greater than a size of the PCB housing 8. The shape of the PCB housing accommodation wall 62 may correspond to a shape of the PCB housing 8.

The PCB housing accommodation wall 62 may have a terminal pin through-hole 63, through which the terminal pin 55 passes. In particular, the terminal pin 55 may extend into the PCB housing accommodation wall 62 through the terminal pin through-hole 63.

The PCB module 7 may include PCB 71, which may have at least one circuit formed thereon. The PCB 71 may be provided with a terminal clip 72 that connects to and disconnects from terminal pin 55 of bus bar 5.

The at least one circuit formed on PCB 71 may be, for example, a protection circuit configured to protect the battery pack P.

The PCB 71 may have a terminal pin through-hole 71A, through which the terminal pin 55 passes. The terminal pin through-hole 71A may be formed at a position facing the inside of the terminal clip 72. As such, terminal pin 55 of bus bar 5 may be connected to terminal clip 72 of PCB 71 through the terminal pin through-hole 71A.

The terminal clip 72 may be connected to the at least one circuit of the PCB 71. For example, upon contact between the terminal pin 55 and the terminal clip 72, the PCB 71 may be electrically connected to the bus bar 5 through the terminal clip 72.

The terminal clip 72 may include an outer clip 75 and a pair of contacts 76 and 77 that extend into the outer clip 75 and that are elastically deformed by the terminal pin 55.

The outer clip 75 may have a space formed therein, and the terminal pin 55 may enter the space of the outer clip 75 to contact the pair of contacts 76 and 77 and to elastically deform at least one of the contacts 76 or 77.

One end of the pair of contacts 76 and 77 may be connected to the outer clip 75 and the other end thereof may be a free end 78. The pair of contacts 76 and 77 may face each other in the outer clip 75.

The pair of contacts 76 and 77 may be bent such that a distance therebetween decreases and then increases toward the free end 78.

The terminal pin 55 may enter between the pair of contacts 76 and 77 to respectively contact the pair of contacts 76 and 77, and to elastically deform the pair of contacts 76 and 77 away from each other.

In the battery pack P, whether the terminal pin 55 and the contacts 76 and 77 contact each other, and whether the contacts 76 and 77 are elastically deformed may be determined according to the position of the PCB module 7, and more particularly, the terminal clip 72 of PCB module 7.

The PCB 71 may also be mounted with a fuse 73 configured to blow upon application of an excessively high voltage. The fuse 73 may be connected to the at least one circuit of the PCB 71 and may be configured to be blown to protect the battery cell upon applying an overvoltage to PCB 71.

The PCB 71 may also be mounted with a sensor 74 configured to measure a current or voltage of the battery cell 32. The sensor 74 may be connected to the at least one circuit of the PCB 71. The sensor 74 may include a current sensor for measuring a current through the battery cell 32 and/or a voltage sensor for measuring a voltage across the battery cell 32. The sensor 74 may transmit information to at least one processor, for example a controller, that is configured to control the battery pack P. The controller may be configured to, for example, control the battery pack P or a vehicle such as an electric vehicle, in which the battery pack P is mounted, according to the information sensed by the sensor 74.

The PCB housing 8 may include a PCB accommodation space 81 configured to accommodate the PCB 71.

The PCB housing 8 may also include a support wall 82 that supports the terminal clip 72. In some implementations, at least two support walls 82 may be provided in the PCB housing 8. Some or all of at least two support walls 82 may surface-contact the terminal clip 72, and the terminal clip 72 may thus be stably supported and fixed by the PCB housing 8. If two support walls 82 are formed in the PCB housing 8, then the two support walls 82 may face each other in the PCB housing 8, and terminal clip 72 may be supported by the two support walls 82 facing each other. In some implementations, four support walls 82 may be formed in the PCB housing 8. In this case, the four support walls 82 may support the terminal clip 72 in a state of surrounding the terminal clip 72 on four different sides.

The PCB housing may further have a terminal clip through-hole 82A, through which the terminal clip 72 passes. The terminal clip through-hole 82A may be formed in the support wall 82.

In some implementations, the support wall 82 may support the terminal clip 72 at a position spaced apart from a lever 88. A space, in which the lever 88 may be bent, may be formed between the support wall 82 and the lever 88, and may facilitate bending of the lever 88 toward the support wall 82. Further details of the lever 88 will be described further below.

The PCB housing 8 may also include an engaging projection 83, in which the PCB 71 accommodated in the PCB accommodation space is locked. As such, the engaging projection 83 may help ensure that the PCB 71 is not be excessively inserted into the PCB housing 8 in PCB accommodating space 81.

The PCB module 7, arbitrary removal of which may be restricted after being inserted into the PCB housing 8, may thus be fixed to the PCB housing 8.

In some implementations, a projection 79 engaged with the PCB housing 8 may be formed on at least one of the PCB 71 or the terminal clip 72. The projection 79 may be configured to engage with the PCB housing 8 in a direction in which the PCB module 7 is not arbitrarily removed from the PCB housing 8.

The projection 79 may be engaged with and seated in the end of the support wall 82 when the PCB 71 is completely inserted into the PCB accommodation space 81.

The projection 79 may protrude from the terminal clip 72 to be engaged with the end of the support wall 82. The projection 79 may have any suitable shape, for example, a triangular cross-sectional shape.

When the PCB module 7 is inserted into the PCB housing 8, a portion of the PCB 71 may be locked in the engaging projection 83 such that the PCB module is not excessively inserted into the PCB housing 8. For example, when the PCB 71 moves in the opposite direction of the engaging projection 83, the projection 79 is locked in the support wall 82 to restrict arbitrary removal of the PCB module 7.

The terminal clip 72 may have an opening 75A, through which the inside of the terminal clip 72 may be viewed. The opening 75A may be formed in an area, which faces the PCB 71, of the terminal clip 72. In some implementations, the opening 75A may be formed in an outer clip 75 of the terminal clip 72. The opening 75A may be formed in an area, which faces the PCB 71, of the outer clip 75.

In some scenarios, a manufacturer or a service provider may examine a current state of the terminal pin 55 and the current state of the pair of contacts 76 and 77 through the opening 75A. For example, the manufacturer or the service provider may check whether the terminal pin 55 contacts the pair of contacts 76 and 77, or may check whether the pair of contacts 76 and 77 is elastically deformed.

The PCB housing 8 may also have a housing opening 85, through which the terminal clip 72 may be viewed. The housing opening 85 may be formed at the position facing the terminal clip 72 of the PCB housing 8, and a size thereof may be greater than a size of the terminal clip 72.

In some scenarios, the terminal clip 72 may be viewed through the housing opening 85, so that a manufacturer or a service provider may check the appearance of the terminal clip 72 without detaching the PCB module 7 and the PCB housing 8.

For example, the manufacturer or the service provider may check the current state of the terminal pin 55 and the current state of the pair of contacts 76 and 77 through the housing opening 85 of the PCB housing 8 and the opening 75A of the terminal clip 72.

The PCB housing 8 may be inserted into the PCB housing accommodation wall 62 in a state of being coupled with the PCB module 7 and locked in and fixed to the PCB housing accommodation wall 62.

For example, during manufacturing or assembly of the battery pack P, the PCB housing 8 may be locked in the connection board 6 in a state of being coupled with the PCB module 7.

The PCB housing 8 may be locked in the connection board 6 by a locking part 10. The locking part 10 may lock the PCB housing 8 at a first position P1 and lock the PCB housing 8 at a second position P2.

The locking part 10 may lock the PCB housing 8 in the connection board 6 at the first position P1 where the terminal pin 55 does not elastically deform the terminal clip 72. The locking part 10 may lock the PCB housing 8 in the connection board at the second position P2 where the terminal pin 55 elastically deforms the terminal clip 72.

The first position may be a position where the terminal pin 55 does not enter between the pair of contacts 76 and 77. The first position may be a position where a portion of the terminal pin 55 enters between the pair of contacts 76 and 77 but the terminal pin 55 does not contact the pair of contacts 76 and 77. In addition, the first position may be a position where a portion of the terminal pin 55 enters between the pair of contacts 76 and 77 and the terminal pin 55 contacts at least one of the pair of contacts 76 and 77 but does not elastically deform the pair of contacts 76 and 77.

In contrast, the second position may be a position where the terminal pin 55 contacts the pair of contacts 76 and 77 and elastically deforms the pair of contacts 76 and 77.

In some scenarios, a manufacturer may bond the cell lead 31 and the bus bar 5 shown in FIG. 2 using, for example, an ultrasonic bonding method or a vibration bonding method in a state in which the terminal pin 55 elastically deforms the pair of contacts 76 and 77. However, in such scenarios, ultrasonic waves or vibrations generated when bonding the cell lead 31 and the bus bar 5 may be transferred through the terminal pin 55, the terminal clip 72, and the PCB 71. As such, ultrasonic waves or vibrations may be transferred to the fuse 73 or the sensor 74 mounted in the PCB 71, potentially damaging the fuse 73 or the sensor 74.

The battery pack P may be assembled such that ultrasonic waves or vibrations generated upon bonding the cell lead 31 and the bus bar 5, for example caused by ultrasonic bonding methods or vibration bonding method, are mitigated from damaging the fuse 73 or the sensor 74.

For example, in some implementations, the locking part 10 may lock the PCB housing 8 at the first position before bonding the cell lead 31 and the bus bar 5. A manufacturer may thus bond the cell lead 31 and the bus bar 5 using ultrasonic bonding or vibration bonding in a state in which the PCB housing 8 is locked at the first position. The manufacturer may lock the PCB housing 8 at the second position after the process of bonding the cell lead 31 and the bus bar 5. As such, the fuse 73 or the sensor 74 mounted in the PCB 71 may be protected from being damaged.

The locking part 10 may lock the PCB housing 8 in two stages at different positions P1 and P2. By such a 2-stage locking structure, a manufacturer may conveniently assemble the battery pack P while mitigating damage to components such as the fuse 73 and/or the sensor 74.

The locking part 10 may include a protrusion 102 formed on any one of the PCB housing 8 or the connection board 6.

The locking part 10 may also include a first engaging projection 104 formed in the other of the PCB housing 8 or the connection board 6 such that the protrusion is locked in a first stage. The locking part 10 may also include a second engaging projection 106 formed in the other of the PCB housing 8 or the connection board 6 to be spaced apart from the first engaging projection 104 such that the protrusion 102 is locked in a second stage. A gap 108, into which the protrusion 102 is inserted, may be formed between the first engaging projection 104 and the second engaging projection 106.

The protrusion 102 may be formed on any one of the PCB housing 8 and the PCB housing accommodation wall 62 and the first engaging projection 104 and the second engaging projection 106 may be formed on the other of the PCB housing 8 and the PCB housing accommodation wall 62.

If the protrusion 102 protrudes from the PCB housing 8, the first engaging projection 104 and the second engaging projection 106 may be formed on the connection board 6, more particularly, the PCB housing accommodation wall 62. The protrusion 102 protruding from the PCB housing 8 may be inserted into the gap 108 formed between the first engaging projection 104 and the second engaging projection 106 and locked between the first engaging projection 104 and the second engaging projection 106 in the first stage.

Hereinafter, the case in which the protrusion 102 protrudes from the PCB housing 8 and the first engaging projection 104 and the second engaging projection 106 are formed on the PCB housing accommodation wall 62 will be described in greater detail.

In some implementations, the protrusion 102 may be formed on the outer surface of the PCB housing 8.

As shown in FIGS. 3 and 4, a pair of slits 86 and 87 may be formed in the PCB housing 8, and a lever 88 may be formed between the slits. The slits 86 and 87 may be formed on a portion of the PCB housing that is adjacent to the terminal clip 72 in a state in which the terminal clip 72 engages through the terminal clip through-hole 82*a*. The lever 88 may be formed between the pair of slits 86 and 87. The lever 88 may have one end connected to the PCB housing 8 and the other end may be a free end, and may be elastically bent between the pair of slits 86 and 87.

In the examples of FIGS. 5 and 6, the protrusion 102 may be formed on the lever 88. When the lever 88 is elastically bent towards the opposite side 89 of the lever 88, the lever 88 may be separated from the first engaging projection 104 and the second engaging projection 106. As such, the protrusion 102 on the lever 88 may be unlocked from the first engaging projection 104 or the second engaging projection 106.

A gap G may be formed between the lever 88 and the inner surface of the PCB housing accommodation wall 62. In some scenarios, a manufacturer or a service provider may reach the lever 88 through the gap G (e.g., by inserting a tool or his/her finger through the gap G) to elastically bend the lever 88 and easily detach the PCB housing 8 from the PCB housing accommodation wall 62.

The first engaging projection 104 and the second engaging projection 106 may protrude from the inner surface of the PCB housing accommodation wall 62. The first engaging projection 104 and the second engaging projection 106 may be formed to face the lever 88 and protrude toward the lever 88.

The protrusion 102 may be inserted into the gap 108 between the first engaging projection 104 and the second engaging projection 106 over the first engaging projection 104 and may be locked by the first engaging projection 104 and the second engaging projection 106 as shown in FIG. 5. At this time, the PCB housing 8 may be at the first position.

The protrusion 102 may move from the gap 108 between the first engaging projection 104 and the second engaging projection 106 over the second engaging projection 106 and may be locked in the second engaging projection 106 as shown in FIG. 6. At this time, the PCB housing 8 may be at the second position.

The battery pack P may have a structure in which delivery of ultrasonic waves or vibrations generated upon bonding the cell lead 31 and the bus bar 5 to the pair of contacts 76 and 77 is minimized.

The pair of contacts 76 and 77 may face each other in a direction orthogonal to the longitudinal direction of the PCB 71. If the PCB 71 is elongated in the left-and-right direction, the pair of contacts 76 and 77 may face each other in the up-and-down direction or the front-and-rear direction.

The pair of contacts 76 and 77 may face each other in a direction (Y direction) orthogonal to the contact direction (X direction) of the cell lead 31 and the bus bar 5.

If the pair of contacts 76 and 77 face each other in a direction parallel to the contact direction (X direction) of the cell lead 31 and the bus bar 5, the vibration direction of the cell lead 31 and the bus bar 5 may be equal to the contact direction (X direction) of the cell lead 31 and the bus bar 5 and the terminal pin 55 may vibrate while alternately elastically deforming the pair of contacts 76 and 77 during bonding of the cell lead 31 and the bus bar 5.

Ultrasonic waves or vibrations delivered to the terminal pin 55 may be alternately delivered through the pair of the contacts 76 and 77 and vibrations delivered to the pair of contacts 76 and 77 may be delivered to the fuse 73 or the sensor 74 through the PCB 71.

For example, if the cell lead 31 and the bus bar 5 contact each other in the left-and-right direction and the pair of contacts 76 and 77 are spaced apart from each other in the left-and-right direction, ultrasonic waves or vibrations generated upon bonding the cell lead 31 and the bus bar 5 may be delivered through the terminal pin 55 in the left-and-right direction, the terminal pin 55 vibrating in the left-and-right direction may alternately elastically deform the pair of contacts 76 and 77 in the left-and-right direction, and vibrations delivered to the fuse 73 or the sensor 74 of the PCB 71 may be large.

In contrast, if the pair of contacts 76 and 77 faces each other in the direction (Y direction) orthogonal to the contact direction (X direction) of the cell lead 31 and the bus bar 5, the terminal pin 55 may vibrate between the pair of contacts 76 and 77 without contacting the pair of contacts 76 and 77 or may slidably vibrate in a state of contacting at least one of the pair of contacts 76 and 77.

As a more detailed example, the cell lead 31 and the bus bar 5 may contact each other in the left-and-right direction in a state of facing each other in the left-and-right direction and ultrasonic waves or vibrations may be generated in the left-and-right direction upon bonding the cell lead 31 and the bus bar 5. In this case, the pair of contacts 76 and 77 may face each other in an up-and-down direction orthogonal to the left-and-right direction. The terminal pin 55 may vibrate in the left-and-right direction in a state in which a portion of the terminal pin 55 enters between the pair of contacts 76 and 77 upon bonding the cell lead 31 and the bus bar 5 and the terminal pin 55 vibrating between the pair of contacts 76 and 77 may slidably vibrate in a state of contacting at least one of the pair of contacts 76 and 77 or vibrate without contacting the pair of contacts 76 and 77. In this case, it is possible to minimize ultrasonic waves or vibrations delivered to the pair of contacts 76 and 77.

In contrast, the cell lead 31 and the bus bar 5 may contact each other in the up-and-down direction in a state of facing each other in the up-and-down direction and ultrasonic waves or vibrations may be generated in the up-and-down direction upon bonding the cell lead 31 and the bus bar 5. In this case, the pair of contacts 76 and 77 may face each other in the left-and-right direction orthogonal to the up-and-down direction. The terminal pin 55 may vibrate in the up-and-down direction in a state in which a portion of the terminal pin 55 is inserted between the pair of contacts 76 and 77 upon bonding the cell lead 31 and the bus bar 5 and the terminal pin 55 vibrating between the pair of contacts 76 and 77 may slidably vibrate in a state of contacting at least one of the pair of contacts 76 and 77 or vibrate without contacting the pair of contacts 76 and 77. In this case, it is possible to minimize ultrasonic waves or vibrations delivered to the pair of contacts 76 and 77.

Hereinafter, an example of operation of an implementation will be described.

In the battery pack P of this implementations, the cell lead and the bus bar 5 may be bonded in a state of temporarily assembling the PCB housing 8 on the connection board 6 and the PCB housing 8 may be completely assembled on the connection board 6 after the process of bonding the cell lead 31 and the bus bar 5 is completed.

Here, the position where the PCB housing 8 is temporarily assembled may be a position where the PCB housing 8 is inserted into the PCB housing accommodation wall 62 to a first depth, as shown in FIG. 5. At this time, the terminal pin 55 may not contact at least one of the pair of contacts 76 and 77 or may elastically deform the pair of contacts 76 and 77.

The position where the PCB housing 8 is completely assembled may be a position where the PCB housing 8 is inserted into the PCB housing accommodation wall 62 at a second depth (second depth>first depth), as shown in FIG. 6. At this time, the terminal pin 55 may elastically deform the pair of contacts 76 and 77.

The manufacturer may push the PCB housing 8 into the PCB housing accommodation wall 62 by a predetermined depth. At this time, the protrusion 102 climbs over the first engaging projection 104.

At this time, the protrusion 102 may be inserted into the gap 108 formed between the first engaging projection 104 and the second engaging projection 106 and the protrusion 102 may be locked between the first engaging projection 104 and the second engaging projection 106. The PCB housing 8 may be positioned at the first position P1 where the terminal pin 55 does not contact at least one of the pair of contacts 76 and 77 or does not elastically deform the pair of contacts 76 and 77, and temporary assembly of the PCB housing 8 may be completed.

The manufacturer may bring the cell lead 31 of the battery cell 32 into contact with the bus bar 5 and bond the cell lead 31 and the bus bar 5 using the ultrasonic bonding method or the vibration bonding method, in a state of completing temporary assembly of the PCB housing 8.

Upon bonding the cell lead 31 and the bus bar 5 using the ultrasonic bonding method or the vibration bonding method, it is possible to prevent vibrations from being delivered to the pair of contacts 76 and 77 or to minimize delivered vibrations and to minimize damage to the parts mounted in the PCB 71, e.g., the fuse 73 or the sensor 74.

The manufacturer may more deeply push the PCB housing 8 into the PCB housing accommodation wall 62 after bonding of the cell lead 31 and the bus bar 5 is completed.

The protrusion 102 locked between the engaging projection 104 and the second engaging projection 106 may climb over the second engaging projection 106 to be locked by the second engaging projection 106. At this time, the PCB housing 8 may be located at the second position P2 where the terminal pin 55 elastically deforms the pair of contacts 76 and 77 and assembly of the PCB housing 8 may be completed.

Figure 7:
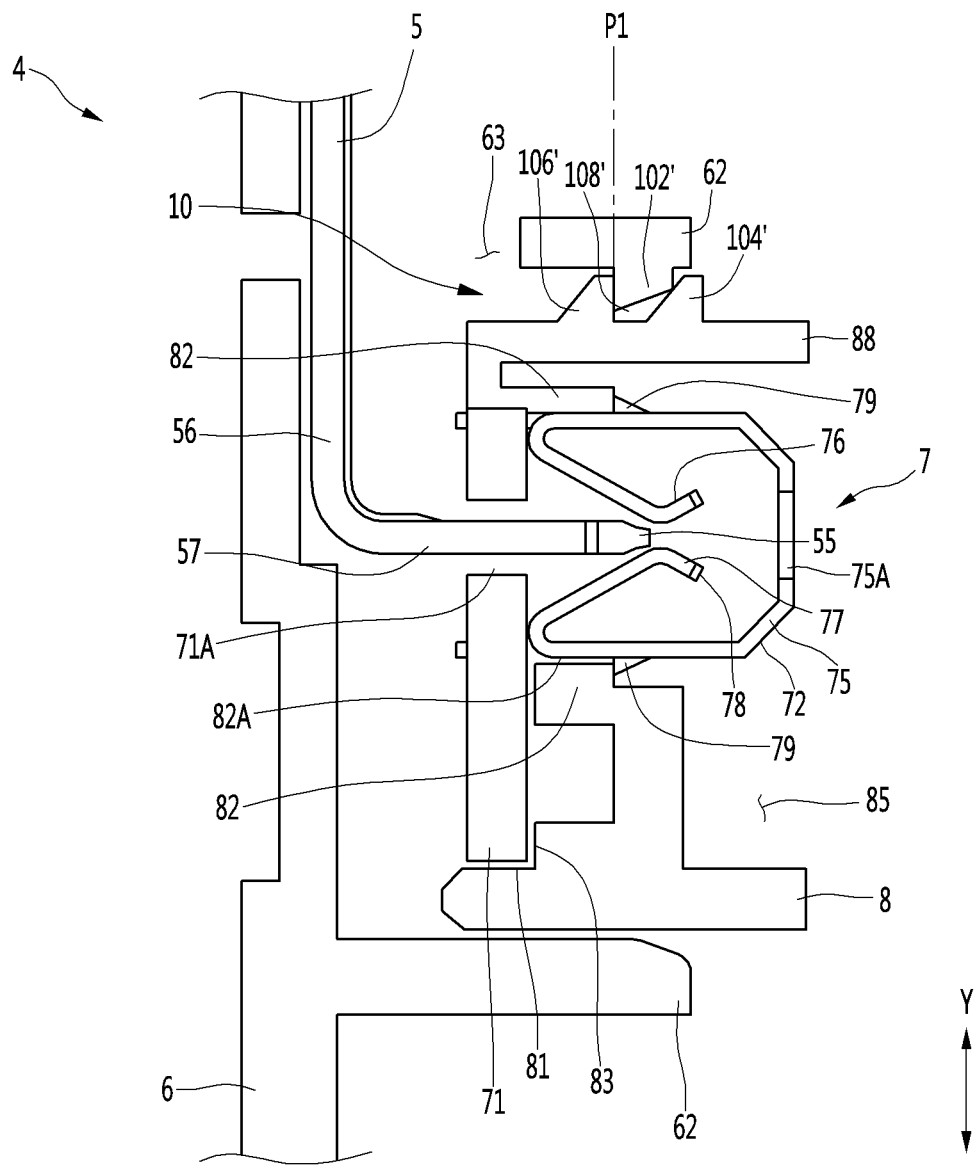
FIG. 7 is a diagram illustrating an example of an enlarged cross-sectional view showing a bus bar and a PCB module before a shell lead and the bus bar are bonded, according to another implementation.
Figure 8:
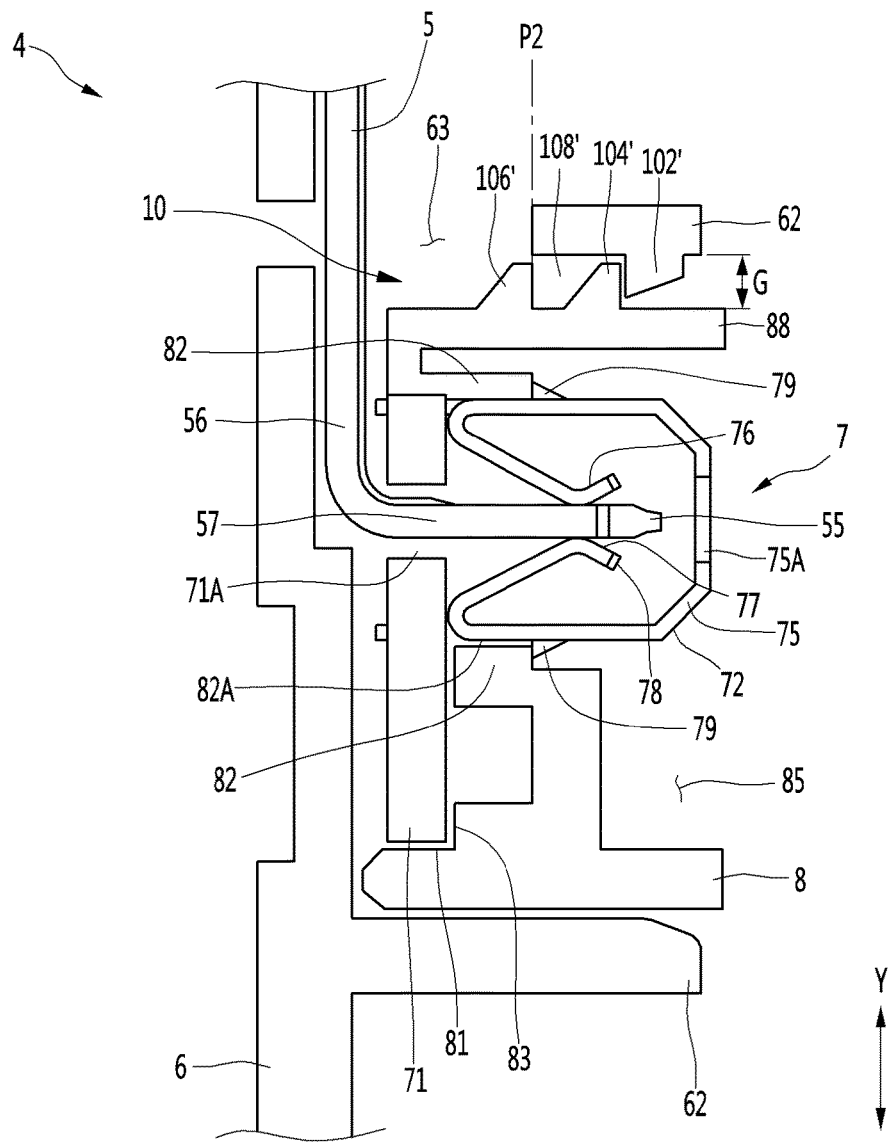
FIG. 8 is a diagram illustrating an example of an enlarged cross-sectional view showing a bus bar and a PCB module after a shell lead and the bus bar are bonded, according to another implementation.

FIG. 7 is an enlarged cross-sectional view showing a bus bar and a PCB module before a shell lead and the bus bar are bonded, according to another implementation, and FIG. 8 is an enlarged cross-sectional view showing the bus bar and the PCB module after the shell lead and the bus bar are bonded, according to another implementation.

This implementation is similar to the above-described implementation, except for the positions of the protrusion 102', the first engaging projection 104' and the second engaging projection 106' and thus the same parts as the above-described implementations are denoted by the same reference numerals and a detailed description thereof will be omitted.

The protrusion 102' may protrude from the connection board 6, more particularly, the PCB housing accommodation wall 62. The protrusion 102' may protrude from the inner surface of the PCB housing accommodation wall 62.

The first engaging projection 104' and the second engaging projection 106' may protrude from the PCB housing 8. The first engaging projection 104' and the second engaging projection 106' may protrude from the lever of the PCB housing 8.

The manufacturer may push the PCB housing 8 into the PCB housing accommodation wall 62 by a predetermined depth. At this time, the second engaging projection 106' may climb over the protrusion 102'.

After the second engaging projection 106' climbs over the protrusion 102', the lever 88 may be elastically restored, the protrusion 102' may be inserted into the gap 108' formed between the first engaging projection 104' and the second engaging projection 106', and the first engaging projection 104' and the second engaging projection 106' may be positioned within the protrusion 102' interposed therebetween. At this time, the first engaging projection 104' and the second engaging projection 106' may be locked by the protrusion 102' such that the PCB housing 8 is locked at the first position P1.

After completing the process of bonding the cell lead 31 and the bus bar 5, the manufacturer may more deeply push the PCB housing 8 into the PCB housing accommodation wall 62. At this time, the first engaging projection 104' may climb over the protrusion 102' and the first engaging projection 104' may be locked by the protrusion 102'. At this time, the PCB housing 8 may be locked at the second position P2.

Although some examples have been described with reference to a number of illustrative implementations thereof, various changes in form and details may be made therein without departing from the spirit and scope of the invention as defined by the appended claims.

What is claimed is:
1. A battery pack comprising:
a battery cell comprising a cell lead;
a bus bar bonded to the cell lead, the bus bar having a terminal pin;
a connection board having the bus bar mounted thereon;
a printed circuit board (PCB) having a terminal clip mounted thereon, the terminal clip of the PCB config- ured to be selectively connected to and disconnected from the terminal pin of the bus bar mounted on the connection board;
a PCB housing defining a PCB accommodation space that accommodates the PCB; and
a locking part configured to:
in a first locking state, lock the PCB housing to the connection board at a first position in which the terminal pin of the bus bar mounted on the connection board does not elastically deform the terminal clip of the PCB; and
in a second locking state, lock the PCB housing to the connection board at a second position in which the terminal pin elastically deforms the terminal clip.

2. The battery pack according to claim 1, wherein the terminal clip of the PCB defines an opening through which an inside of the terminal clip is accessible, the opening formed in an area of the terminal clip that faces the PCB.

3. The battery pack according to claim 1, wherein the locking part comprises:
a protrusion formed on one of the PCB housing or the connection board;
a first engaging projection formed on an other of the PCB housing or the connection board and configured to lock the protrusion in the first locking state of the locking part; and
a second engaging projection formed on the other of the PCB housing or the connection board, the second engaging projection spaced apart from the first engaging projection and configured to lock the protrusion in the second locking state of the locking part.

4. The battery pack according to claim 3, wherein the first engaging projection and the second engaging projection of the locking part are configured to define a gap therebetween into which the protrusion of the locking part is inserted.

5. The battery pack according to claim 3, wherein:
the connection board further comprises a PCB housing accommodation wall configured to accommodate the PCB housing, and
a size of the PCB housing accommodation wall is greater than a size of the PCB housing.

6. The battery pack according to claim 5, wherein:
the protrusion of the locking part protrudes from an outer surface of the PCB housing, and
the first engaging projection and the second engaging projection of the locking part protrude from an inner surface of the PCB housing accommodation wall of the connection board.

7. The battery pack according to claim 6, wherein:
the PCB housing defines a pair of slits on a portion of the PCB housing that is adjacent to the terminal clip of the PCB in a state in which the PCB is housed in the PCB housing, and
a lever connected to the PCB housing is formed between the pair of slits.

8. The battery pack according to claim 7, wherein the protrusion of the locking part is formed on the lever.

9. The battery pack according to claim 7, wherein the lever and the inner surface of the PCB housing accommodation wall define a gap therebetween, wherein the protrusion of the locking part is configured to be inserted into the gap.

10. The battery pack according to claim 1, wherein the terminal clip of the PCB comprises:
an outer clip; and
a pair of contacts extending from the outer clip to an inside of the outer clip, the pair of contacts configured to be elastically deformed by the terminal pin in the second locking state.

11. The battery pack according to claim 10, wherein:
a first end of the pair of contacts of the terminal clip of the PCB is connected to the outer clip of the terminal clip, and
a second end of the pair of contacts is a free end.

12. The battery pack according to claim 10, wherein the locking part is further configured to:
in the first locking state, lock the PCB housing to the connection board at the first position in which the terminal pin of the bus bar mounted on the connection board does not elastically deform the pair of contacts of the PCB; and
in the second locking state, lock the PCB housing to the connection board at the second position in which the terminal pin elastically deforms the pair of contacts.

13. The battery pack according to claim 10, wherein the pair of contacts of the PCB are configured to face each other in a direction that is orthogonal to a contact direction of the cell lead and the bus bar.

14. The battery pack according to claim 10, wherein, in the second locking state:
the terminal pin of the bus bar is configured to enter between the pair of contacts of the terminal clip of the PCB to elastically deform the pair of contacts away from each other.

15. The battery pack according to claim 14, wherein the PCB housing further comprises a support wall configured to support the terminal clip of the PCB.

16. A battery pack comprising:
a battery cell comprising a cell lead;
a bus bar bonded to the cell lead, the bus bar having a terminal pin;
a connection board having the bus bar mounted thereon;
a printed circuit board (PCB) having a terminal clip mounted thereon, the terminal clip of the PCB configured to be selectively connected to and disconnected from the terminal pin of the bus bar mounted on the connection board;
a PCB housing defining a PCB accommodation space that accommodates the PCB; and
a locking part configured to lock the PCB housing to the connection board,
wherein the connection board further comprises a PCB housing accommodation wall configured to accommodate the PCB housing,
wherein the locking part comprises:
a protrusion formed on one of the PCB housing or the PCB housing accommodation wall;
a first engaging projection formed on an other of the PCB housing or the PCB housing accommodation wall; and
a second engaging projection formed on the other of the PCB housing or the PCB housing accommodation wall, the second engaging projection spaced apart from the first engaging projection, and
wherein:
in a first locking state, the protrusion of the locking part is locked by the first engaging projection and the second engaging projection at a first position in which the terminal pin of the bus bar mounted on the connection board does not elastically deform the terminal clip of the PCB, and in a second locking state, the protrusion of the locking part is locked by the second engaging projection at a second position in which the terminal pin elastically deforms the terminal clip.

17. The battery pack according to claim 16, wherein:
the PCB housing defines a pair of slits on a portion of the PCB housing that is adjacent to the terminal clip of the PCB in a state in which the PCB is housed in the PCB housing,
a lever connected to the PCB housing is formed between the pair of slits,
the protrusion of the locking part is formed on the lever, and
the first engaging projection and the second engaging projection of the locking part protrude from an inner surface of the PCB housing accommodation wall of the connection board.

18. The battery pack according to claim 17, wherein the lever and the inner surface of the PCB housing accommodation wall define a gap therebetween, wherein the protrusion of the locking part is configured to be inserted into the gap.

19. The battery pack according to claim 16, wherein the terminal clip of the PCB comprises:
an outer clip; and
a pair of contacts extending from the outer clip to an inside of the outer clip, the pair of contacts configured to be elastically deformed by the terminal pin in the second locking state, and
wherein the pair of contacts of the PCB are configured to face each other in a direction that is orthogonal to a contact direction of the cell lead and the bus bar.

20. The battery pack according to claim 19, wherein the outer clip of the terminal clip of the PCB defines an opening through which an inside of the terminal clip is accessible, the opening formed in an area of the outer clip that faces the PCB.

* * * * *